May 27, 1924.
H. J. FEREDAY
MAGNETIC MEANS FOR PRODUCING, MODIFYING, AND TRANSMITTING MECHANICAL MOVEMENTS AT VARIABLE SPEEDS
Filed Jan. 6, 1921 6 Sheets-Sheet 1
1,495,784
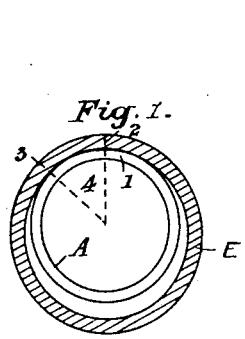
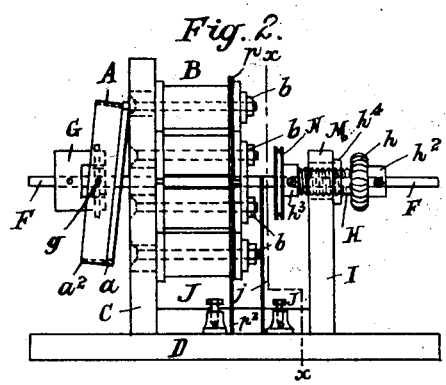
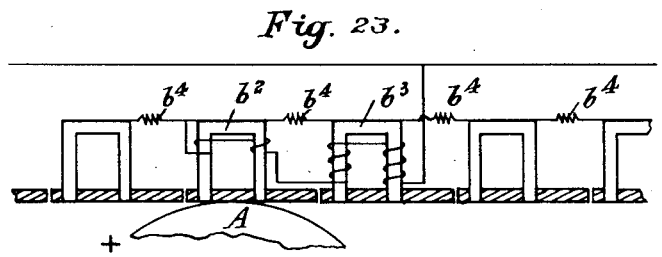
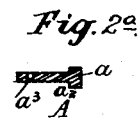
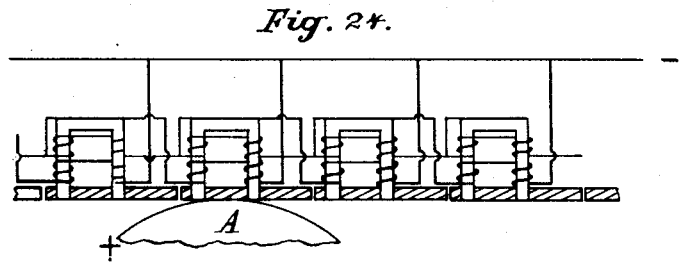
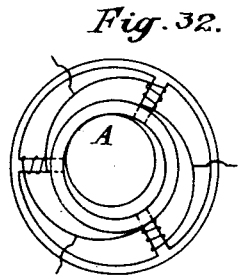
INVENTOR
HARRY J. FEREDAY
BY
ATTORNEYS

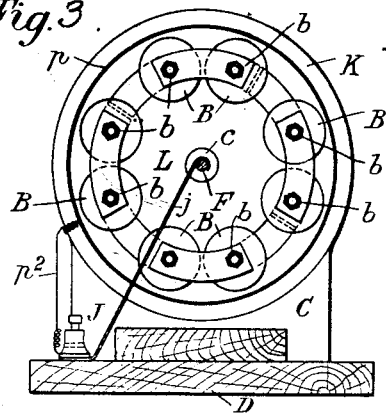
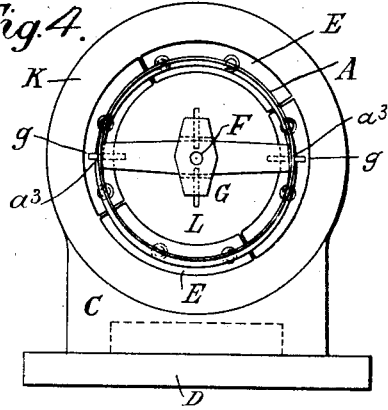
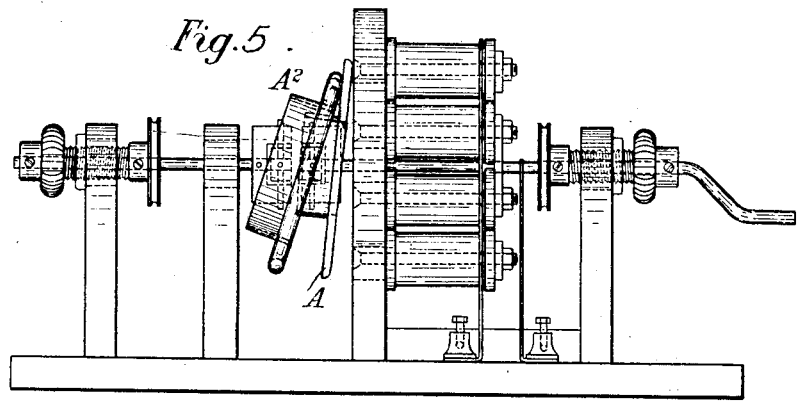
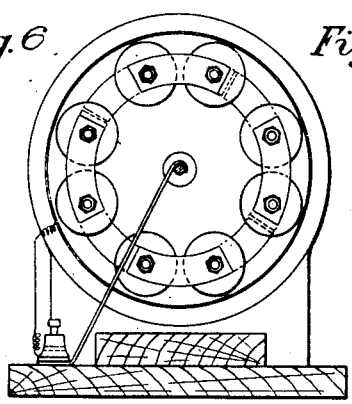
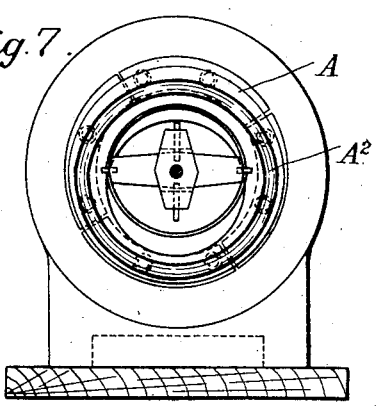

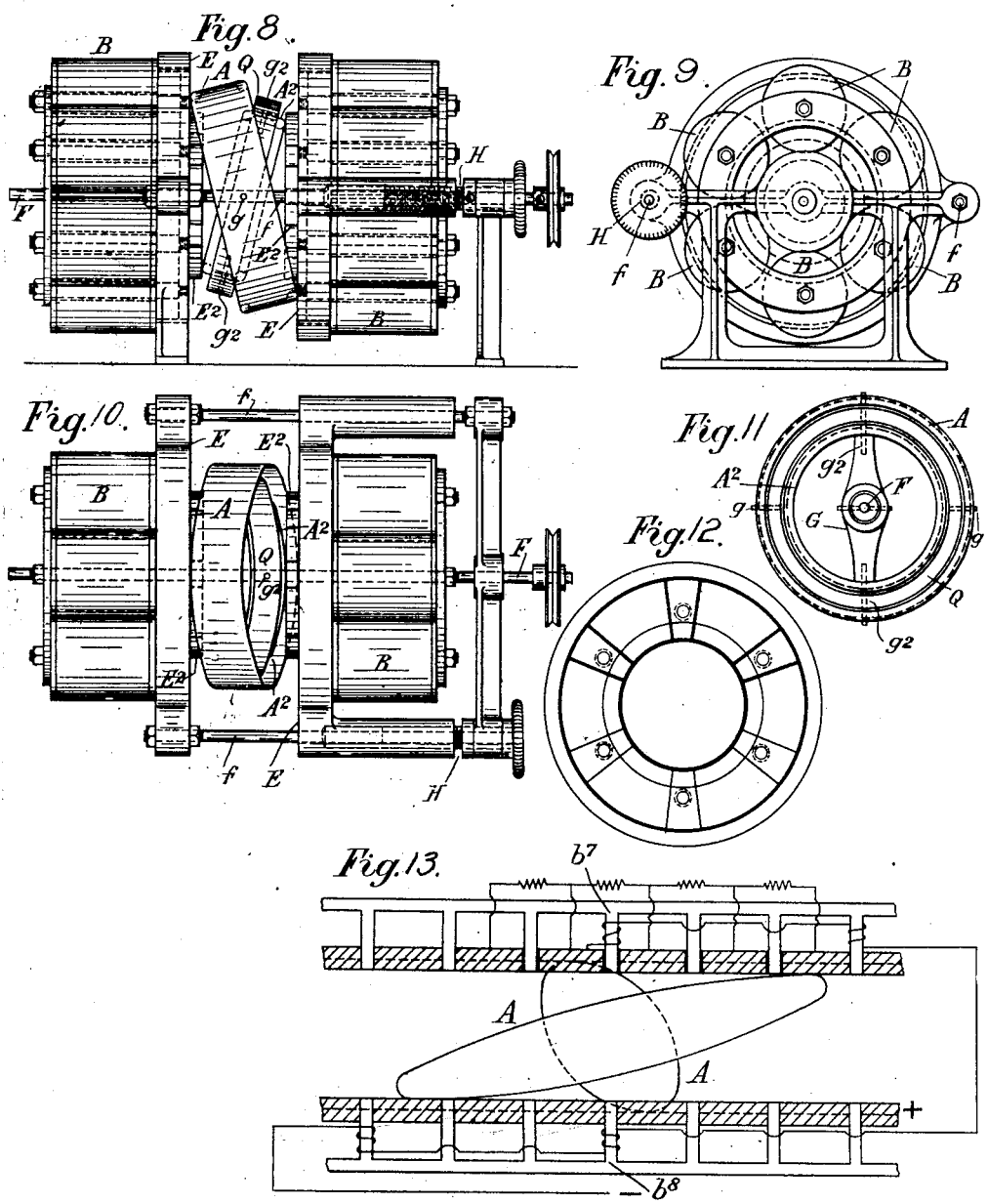

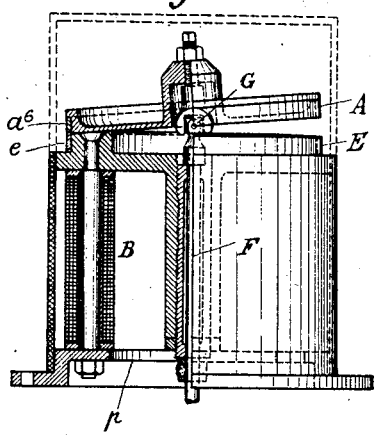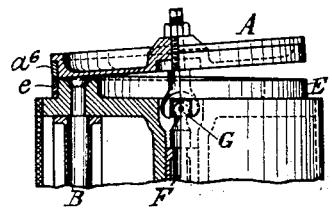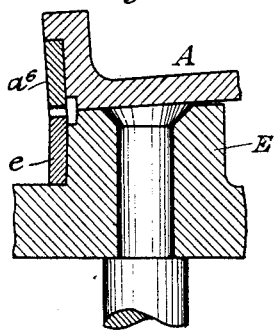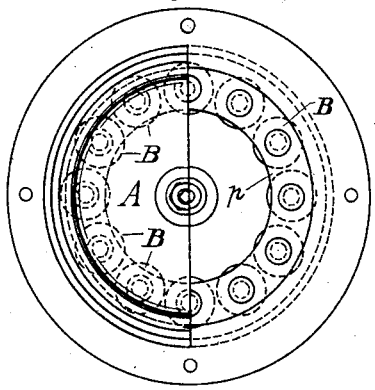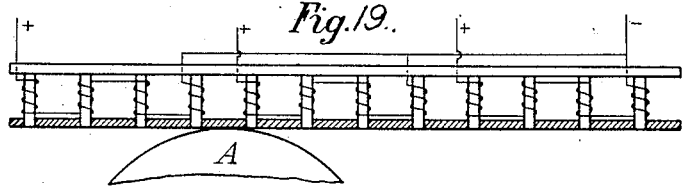

May 27, 1924.

H. J. FEREDAY 1,495,784

MAGNETIC MEANS FOR PRODUCING, MODIFYING, AND TRANSMITTING
MECHANICAL MOVEMENTS AT VARIABLE SPEEDS

Filed Jan. 6, 1921    6 Sheets-Sheet 6

INVENTOR
HARRY J. FEREDAY
BY
ATTORNEYS

Patented May 27, 1924.

1,495,784

UNITED STATES PATENT OFFICE.

HARRY JOHN FEREDAY, OF UPPER TOOTING, LONDON, ENGLAND.

MAGNETIC MEANS FOR PRODUCING, MODIFYING, AND TRANSMITTING MECHANICAL MOVEMENTS AT VARIABLE SPEEDS.

Application filed January 6, 1921. Serial No. 435,393.

*To all whom it may concern:*

Be it known that I, HARRY JOHN FEREDAY, a subject of the King of Great Britain, residing at 22 Huron Road, Upper Tooting, in the county of London, England, have invented new and useful Improvements in Magnetic Means for Producing, Modifying, and Transmitting Mechanical Movements at Variable Speeds, of which the following is a specification.

The object of my invention is to provide simple means by which mechanical movements can be produced, modified and transmitted, in such manner, as hereinafter explained, that the said means can be readily applied to obtain movements for various purposes.

The said means, employed in accordance with my invention, comprise, circular bodies with peripheries, or portions, (or bodies arranged as parts of such peripheries) so relatively positioned that when one of such bodies rolls, or there is rolling movement, of one of the said bodies, relatively to the other, or of both the said bodies relatively to each other, and they are in contact at their peripheries, then, owing to the bodies being of different diameters, or to the peripheral paths of contact being of different diameters, during each complete revolution of rolling motion of one of the bodies (or of both of the bodies relatively to each other), rotatory motion can be conveyed thereto by rolling motion on the opposed body, there being only a portion of a rotation of the rolling body, round its own centre imparted during each of the revolutions of rolling motion, this portion being an amount in accordance with the greatest distance between the peripheries of the two bodies. The rotary movement or movements so obtained can be conveyed from the axis of the body, rolling and rotating as aforesaid through any suitable connections, such as flexible sleeves, or universal joints, which will allow of the movements necessary to bring the peripheral parts into contact, which movements are obtained by magnetic means, such as by the attractive force of electro magnets arranged around or themselves constituting, one of the bodies, which may, for example, be stationary, attracting, in succession, the other body to cause it to come into contact with the first-named body to obtain the succession of rolling movements to be transmitted, as rotary movement, from the rolling body.

The devices to which my invention is applicable can be arranged in various ways:— for example, presuming one of the bodies to be stationary and to have a series of electromagnets around it, the other body which is to revolve and roll around it (producing the movement known as swashing) may be formed with a plain periphery, or it may be a cone passing through an opening in the stationary body and then the speed of the rolling and rotating body can be varied by movement of the cone, lengthwise of its axis, in the opening in the other body which movement, by varying the space between the two bodies will vary the speed of rotation of the said body round its own centre due to the succession of movements obtained by its rolling contact with the other body. Or the flat opposed faces may be utilised as the the peripheries which cause the aforesaid movements, and then by moving these nearer to, or further from, each other the speed can be varied. Or the cone can be the outer body and the other body can be arranged within it. Or there may be, for instance, a ring, or cone, rolling in the body and a ring, or cone, rolling outside, or there may be one body rolling in a cone which cone rolls on a stationary body.

From the foregoing it will be evident that the invention is not limited to the particular arrangements hereinbefore mentioned and that various modifications can be made in accordance with the particular purpose to which the apparatus is to be applied and the kinds of movement, or movements, desired and also the directions, and speed, or speeds, thereof, and the general variations required for each particular purpose.

In the accompanying drawings—

Figure 1 is a diagram referred to in explaining my invention in one form;

Figure 2 is a side elevation of a swash-ring motor in which my invention is embodied in one form;

Figure 2$^a$ is a partial transverse section of the swash-ring alone;

Figure 3 is a section on the line $x$ of Figure 2;

Figure 4 is an end elevation of Figure 2;

Figure 5 is a side elevation of a modified construction;

Figure 6 is an end elevation thereof;

Figure 7 is a similar view seen from the opposite end of the motor;

Figure 8 is a side elevation of another modification;

Figure 9 is an end elevation thereof;

Figure 10 is a plan thereof;

Figures 11 and 12 are elevations of details thereof;

Figure 13 is a diagram of the wiring connections and contacts.

Figure 20:
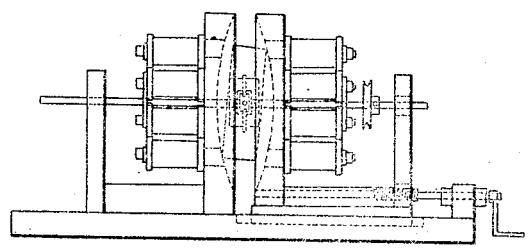
Figure 21:
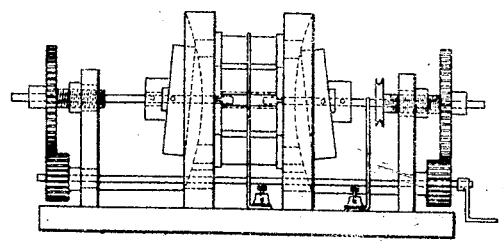
Figure 22:
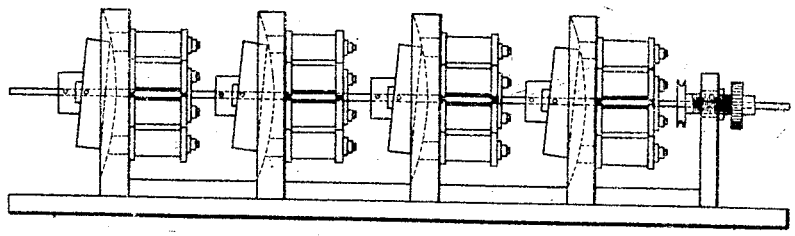

Figure 14 is an elevation (partly in section) of another modification;

Figure 15 is a plan thereof;

Figure 16 is a broken part side elevation and part section illustrating a modification;

Figure 17 is a broken section drawn to a larger scale;

Figure 18 is a broken side elevation shewing part of the engaging faces of the swash-ring and motor contact;

Figure 19 is a diagrammatic development of the contact arrangement;

Figures 20, 21 and 22 are respectively side elevations of further modified embodiments of the invention;

Figures 23, 24, 25, 26, 27 and 28 are diagrammatic developments of various pathway contacts and magnet winding arrangements.

Figure 29:
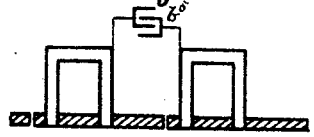

Figure 29 is a diagram of a condenser for suppressing sparking.

Figure 30:
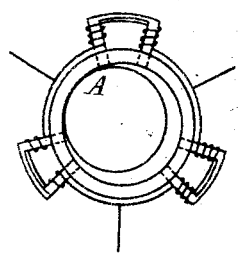
Figure 31:
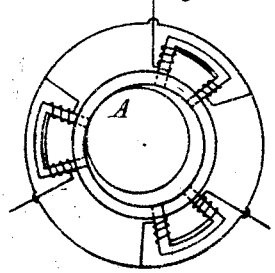

Figures 30, 31, and 32 are diagrammatic views illustrating types of windings in a three-phase motor.

As regards the means by which I can vary the speed of the rotating shaft, or the like, relatively to the speed of the rolling, or swashing, body, these means may, for example, be constituted as follows:—

Taking the case of a ring A rolling round the inside of a cylinder E in a plane at right angles to the axis of the said cylinder as indicated by the diagram Figure 1, the outer periphery of the ring A is less than the inner periphery of the cylinder E, forming the pathway on which the ring A rolls, and therefor any given point 1 on the outer periphery of the ring A, in contact with a point 2, in the pathway constituted by the inner periphery of the cylinder E, will not reach the same point 2, on the said pathway after one complete roll of the ring A, (say in clockwise direction round the inner periphery of the cylinder) but will reach only the point 3, and therefore the ring will have rotated round its own centre only through the angle 4 in an anti-clockwise direction, the said angle depending on the relative proportions of the outer periphery of the ring A and the inner periphery of the cylinder E. Therefore the smaller the outer periphery of the said ring A, relatively to the periphery of the pathway in the cylinder E, the greater will be the angle through which the ring A will move round its own centre during each complete roll and by adjusting the plane of rolling in, or out, of a conical cylinder E in a direction parallel with the axis of the said conical cylinder, the relative proportions of the said two peripheries can be altered, and the speed of rotation of the ring round its own centre be decreased and increased while the speed of rolling remains unchanged.

I will describe, with reference to the accompanying drawings the best means with which I am acquainted for carrying this invention into practical effect.

Figure 2 is a side elevation, Figure 3 is a section on the line $x$ (Figure 2), Figure 4 is an end elevation and Figure $2^a$ is a transverse section of the swash-ring of a motor having one swash ring A and one set of horse-shoe magnets B attached to the insulator C affixed to the base-plate D and having a divided circular pathway E, against which the swash ring A rolls, or swashes. This ring A I term a swash ring because of its swashing action as distinguished from the action of a ring rolling against a surface in the plane of the ring. The said swash ring A is attached to the shaft F by means of the universal joint G, the said shaft being mounted in the insulated bearing $c$ in the centre of the said circular divided pathway upon the insulator C; the bearing from the other end of the shaft being through the axis of a screw H, having a milled head $h$, the said screw being capable of being screwed to and fro in the vertical support I affixed to the base-plate D.

J. J. are the terminals for the conductors of the electric current for working the apparatus, which current is supplied, from a battery, or other convenient source of electricity, to the coils of the electro-magnets B, which are shewn as being four horse-shoe electro-magnets arranged around the divided circular pathway E, one of the terminals J being in connection with the shaft F through the conductor $j$ and the other of the terminals J being connected with the wire $p$ common to all the magnet windings through the conductor $p^2$.

The circular divided pathway E, is of non-magnetic material (such as gunmetal, for instance) with a plane surface, separated, in the example shewn, into four equal segments with a space between them to insulate them from each other. They are held in position by the surrounding material K, which grips them and constitutes the support to keep the pathway perpendicular to the base of the apparatus. In each of these segments are placed the poles of one of the horse-shoe magnets B, so that the said poles are flush with the surface of the pathway. The said poles are shewn circular, but they may be of any other suitable shape. In some cases they may radiate.

The screw H can be screwed in and out of the nut M let into the support I, there being, at one end of the said screw, a collar $h^2$ affixed to the shaft and also affixed to the said shaft at the other end of the said screw, is a pulley N, with a collar $h^3$. When the screw H is rotated in the nut M, longitudinal motion is given to the shaft F and the universal joint G is moved nearer to or farther from, the pathway E, the lock-nut $h^4$ being provided to prevent the screw H from turning and thus the universal joint G will be secured in the adjusted position.

The swash ring A is of soft iron, its cross sectional form being as shewn in Figure $2^a$, the bulbular portion $a$ being of sufficient area for magnetic flux, and the body portion $a^2$ providing a support for the end pins $g$ of the universal joint G, the said pins being engaged with holes $a^3$ in the portion of $a^2$ at some distance from the plane of the periphery of contact of the swash ring with the path E in the direction away from the pathway.

The movement of the screw H to one extreme will bring the whole periphery of contact of the swash ring A against the pathway E, whilst the movement of the said screw to the other extreme will give the maximum inclination of the swash ring to the said pathway. The position of the engagement of the pins $g$ with the swash ring A, causes it, when inclined, to come, under the action of gravity, against the pathway E, so that the said ring is always ready to conduct current to the top segment of the said pathway. Although the periphery of contact of the swash ring with the pathway remains constant, the diameter of the pathway of contact is altered when the adjusting screw H is screwed in, or out. I can employ any other suitable mechanism whereby the universal joint G can be moved backwards and forwards.

As the speed of rotation of the shaft, to which the swash ring is attached through the universal joint, relatively to the speed of the roll, or swash, of the swash ring, varies as the difference between the two peripheries varies, when the swash ring is flat against the pathway the two peripheries are coincident and there is no movement, but as the universal joint is moved from the pathway, the difference between the peripheries increases and consequently the speed of rotation of the shaft also increases, and the increase of such speed for a definite longitudinal movement of the centre of the universal joint, is greater, the greater the distance of the pins $g$ from the contact plane of the swash ring, and the relative speed is still greater if the swash ring swashes on a concave surface.

The swashing motion of the swash ring A in the apparatus, Figures 2, 3 and 4, is obtained as follows:—

The current is led from one of the terminals J through the contact wire $j$ to the shaft F and passes from thence through the universal joint G, into the swash ring A, if it be made of metal, or through flexible leads from the shaft to the rim $a$ of the swash ring A if there be no metallic continuity through the universal joint G, the current passing then through the point of contact of the swash ring with one of the segments of the pathway and to the core of the magnet. I will presume the said segment to be the upper one, as the swash ring is on contact with that segment when no current is passing. As the current passes into the system of wiring immediately the current is applied the motor starts immediately, even under full load. From the top segment the current passes into and energizes, the winding of the magnet attached to the next segment, to the right hand for instance, which magnet, being energized, attracts the swash ring A and causes it to swash on to the next segment of the pathway and so on with regard to succeeding magnets and magnetic attractions whilst current is supplied.

The current from the segment of the pathway E is passed through the respective magnet cores being taken from one of the nuts $b$ on the connecting bars at the back, through the magnet coils, and thence to a conductor $p$ common to all segments and connected, by the conductor $p^2$, to the other terminal J.

The direction of rotation of the successive magnetization as seen from the swash ring end of the motor is clockwise and, because the centre of the universal joint is away from the plane of periphery of contact in the direction away from the pathway, the swash ring rotates on its own centre also in a clockwise direction, the diameter of periphery of contact of the swash ring being greater than the diameter of the pathway. If the universal joint had been in the position G relative to the periphery of contact as shewn in Figure 16 the direction of rotation of the swash ring round its own centre would have been anti-clockwise with a clockwise direction of successive magnetization because the diameter of the periphery of contact of the swash ring is less than the diameter of the pathway. I can also place the centre of the universal joint in such an intermediate position that there shall be zero rotation of the swash ring round its own centre and by moving the centre of the universal joint to and fro through the zero point, in a direction longitudinal to the axis of the shaft to which it is attached. I can obtain a reversal of direction of rotation of the swash ring round its own centre without a reversal of the direction of rotation of the successive magnetization and also a variation of speed.

Figure 27:
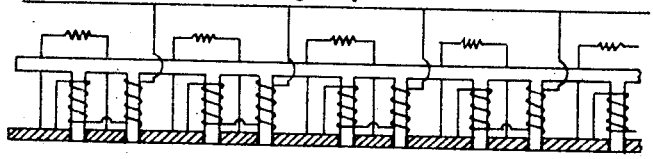
Figure 28:
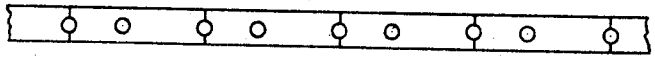

Instead of the connecting bars forming separate horseshoe magnets, all the magnet cores may be connected by one circular ring to form a multipolar magnet, on which case every alternate pole is at a point between the four segments of the divided pathway at E and these poles, and also all the other poles, are insulated from the segments which are all insulated from one another as diagrammatically illustrated in Figures 27 and 28. The current from the swash ring is conveyed through a segment of the divided up pathway direct to the magnet winding, and not through the iron of the magnet. The wiring will be readily understood from Figure 27.

Figure 25:
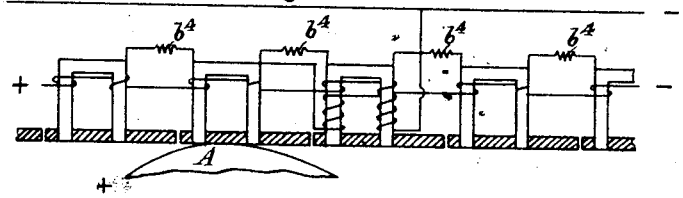

The system of wiring presumed to be employed in the hereinbefore described apparatus to produce the movement of the swash ring can be of any suitable kind, such for example as those illustrated diagrammatically in Figures 23 and 25. In the wiring arrangement illustrated in Figure 23 the current from the rolling or swashing ring (indicated at A in all these figures) energizes, to the desired degree the magnet $b^2$ attached to the segment of the pathway E with which the swashing ring A is then in contact, as well as energizing to a greater extent the magnet $b^3$, which latter causes the rolling or swashing. The windings on the magnets $b^2$ and $b^3$ are in series. The windings on the magnet $b^2$ improve the working of the apparatus by keeping the swash ring against the pathway while the said ring is being swashed, on to the next segment, by the magnet $b^3$ the same operation being then performed by the succeeding magnet and so on in succession whilst the apparatus is in action. The winding or windings on the magnet or magnets following the magnet which produces the rolling, or swashing, is also a means of keeping the speed of rolling or swashing constant within the limits under a varying voltage of supply, because the said following magnet, or magnets, will have a retarding effect on the rolling, or swashing, which retarding effect can be made to increase under an increase of voltage at a greater rate than the increase of the rolling or swashing effect depending on the magnetic saturation of the magnets and the same effects can be produced under a decrease of voltage supply.

The series winding in all the magnets shewn in Figure 25 is another means of keeping the rolling ring, or swash ring, in contact with the surface on which it rolls or swashes. The series coils on all the magnets form a shunt to the main coils.

In both the arrangements of wiring shewn in Figures 23 and 25, a clockwise direction of the centre of the rolling, or swashing, body round the centre of the pathway is obtained. If reverse direction of motion be permanently required, the arrangement of winding is reversed and the division between the pathway segments is towards the left hand magnets. I can instantly reverse the direction of rolling and swashing and with it the direction of rotation of the shaft, by placing the division between the segments of the pathway midway between the magnets and connecting up the electrical conductors between the terminal screws and the magnets and the magnet winding through a four pole reversing switch.

Figure 26:
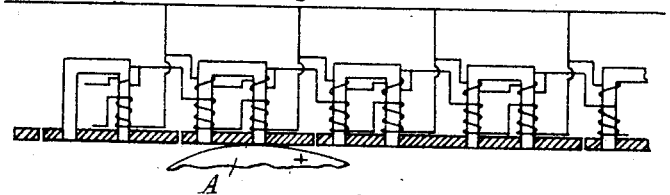

Between all the segments of the pathway, or between the magnets on the segments of the pathway is generally (to prevent sparking) a high resistance marked $b^4$ in the aforesaid figures illustrating suitable magnet windings and connections. Or I can employ a condenser as indicated at $b^5$ in Figure 29 or I can employ current passing through the high resistance to circulate as additional windings on the magnets in the same direction as the main current (derived from any suitable source) in the operating magnet and thus assist the production of the magnetic flux as indicated in Figures 24, or in a contrary direction to the main winding of the magnet, immediately behind the operating magnet, to quicken the demagnetizing, as indicated in Figure 26.

The current may be direct, or alternating, of any usual or suitable periodicity, or I can use three or other phase alternating currents. With three phase current in which the speed of roll or swash synchronizes with the periodicity, three magnets, or a multiple of three magnets are placed round the pathway and the winding for three horse-shoe magnets can be as shewn in the diagrams Figures 30 and 31. The pathway need not be divided into segments as when using direct, or single phase, currents, there is a rotating magnetic field from the three phase winding. In all cases I can use a multipolar magnet as illustrated in its simplest form in the diagram Figure 32.

In all cases where an alternating current is used, I can reverse the direction of roll, or swash, by a reversing switch, in the manner hereinbefore explained for direct current, but in the case of three phase, the position of only two of the conductors relatively to the third need be reversed.

I will now describe a few modifications of the apparatus, in accordance with my invention.

I can use two swash rings, one rolling on the other against a plate as shewn at A and A² in Figures 5 and 6 and 7, the said rings being connected respectively to two shafts in line with each other by means of universal joints each shaft and ring being capable of adjustment by means of screws substantially as explained with regard to the single swash plate arrangement, Figures 2 and 4. By such means I can get two separate shafts from the same motor each having a separate variable speed.

I can also arrange my apparatus as shewn in Figures 8 to 13, where two concentric rings (A and A²) swash simultaneously, the ring A being larger in diameter than the ring A², but the said rings being so arranged as to work synchronously and allow of variation of speed relatively to the speed of swash as in the construction of apparatus shewn in Figures 2 and 4. The two swash rings A and A² each roll on two-plane circular paths (E and E² respectively) parallel to each other. The two sets of magnets B are multipolar. In this arrangement there are only three active segments (indicated at 1, 2 and 3 in Figures 12 and 13) of the divided up pathway between four (indicated at 4, 5, 6 and 7 in the said figures) of the six magnet poles, of one pair of the stepped plates E, E² which segments conduct the current from one, or other, of the two swash rings, A or A², to the magnet windings, and these three segments are insulated from each other and from the remainder of the pathway, and also from the said four poles. In the other of the stepped plates E, E², on which the two concentric rings A, A², roll, or swash, the magnet is multipolar, as in the case of the one with the divided up pathway, but the pathway is continuous and the poles are not insulated from it, and there is no electrical connection between this pathway and the magnet-winding. A diagram of the winding of the poles and the division of the pathway into segments is shewn in Figure 13, and the shape of the poles is shewn in Figure 12. In Figure 13 the pole marked $b^7$ is the one at the top of the divided pathway and the pole marked $b^8$ is the one at the bottom of the continuous pathway of the other plate between which the two rings roll, or swash.

As the swash-rings A, A² are of different diameters and are both connected through the universal joints G, to the same shaft F, the inclination of both rings to the pathways on which they roll, or swash, and consequently the ratio of the diameter of a ring to the diameter of the pathway on which it swashes, should be the same for both rings A and A² for the most efficient working of the apparatus. It is obvious from this that the angle of inclination of one ring to the plane of its pathway can be altered by moving (through the guide rods $f$) the pathways, and their magnets at one side, closer to, or further from those on the other side, along any suitable slides, for instance, as shewn in Figures 8, 9 and 10, by means of the screw H, (which may be arranged analogously to that shewn in Figure 2) the angle of inclination of the other ring to its pathway being altered to approximately a corresponding extent depending on the amount of separation of the two pathways. By this means the speed of rotation of the shaft relatively to the speed of rolling, or swashing, of the two rings A, A² can be altered. Instead of stepped pathways as shewn, conical pathways may be used if desired.

In this apparatus one-third of all the magnet windings are active at a time; three active pathway segments in all are required and each ring is swashed by six magnetic attractions during each roll, or swash, at opposite diameters, making twelve attractions in all for each ring, or twenty-four for the motor.

I can use any number of concentric rings with any suitable number of magnet poles.

With four concentric rings and twelve poles to each set of magnets and with three active pathway segments in all, there would be a total of ninety-six attractions on the four rings during one swash, and eight magnet poles would be active at one time.

The swash rings A, A² have between them, and concentric with both, another ring Q (which may be either of nonmetallic material, or of metal) attached at the ends of a diameter, by pins $g$, to the swash ring A and, at the ends of another diameter at right angles to the first, attached, by pins $g^2$ to the swash ring A² which is in turn, attached by a universal joint at G to the shaft F (see Figure 11). By this means each swash ring has a universal movement independent of the other. The current may be led into the swash rings from the undivided pathway if the ring Q be of non-metallic material, or into the shaft if the said ring be of metal.

In all the arrangements I can have any suitable number of magnets in the circle, and these can be arranged in any position suitable for the particular arrangement of the apparatus.

It will be evident that I can have any number of motors at any distance apart working in exact synchronization with a master motor, all worked from one source of electrical power. For instance, I can pass an electric current from a source of supply into a motor as described with regard to the construction shewn in Figures 2, 3 and 4, and I can take the current which passes through the swash-ring into the divided up-segments of the pathway through, not only the operating magnets of this master motor, but through corresponding magnets in many other motors placed at any distance away, the current to the several motors being either in series or in parallel, when all the motors will be synchronized as regards the speed of rolling or swashing of the swash-ring.

Another construction of motor in accordance with my invention is illustrated in Figures 14 to 19, Figure 14 being an elevation with half in section shewing the pathway E, one of the twelve bobbins B, of non-magnetic material carried on the pole-pieces secured to the plate $p$. The swash ring A, is of iron or steel, and the universal joint G, attaches the swash plate to the vertical shaft F, from which the required movements can be obtained in any suitable way. Figure 15 is a plan, one half being a plan of upper side and the other half being a plan of underside. Figure 16 shews a variation in the position of the universal joint G relatively to the plane of contact of the swash-ring A so that the direction of rotation of the shaft F will be contrary to that of the roll of the swash ring. Figure 17 is an enlarged detail to illustrate the contact of the swash-ring with the pathway E, Figure 18 shewing in side view a portion of the toothed circular racks $a^6$ and $e$ around the swash ring and the pathway E respectively for maintaining proper ratio between the speed of the swash and the speed of the shaft F.

Six magnetic attractions are, in the example here illustrated, given to the swash-ring A which can be done through three conductors from a transmitter and a common return; the three conductors and the winding of the twelve magnet-poles, are illustrated by the diagram Figure 19. The six impulses are obtained by passing a current through the first of the three conductors, then through the first and second together, then through the second, then through the second and third together, then through the third, and then through the third and the first together and so on. The swash-ring A is shewn in the diagram Figure 19 in the position in which it would be with the current in the first and second conductors.

I can also use the apparatus to connect two shafts on one of which is mounted the body against which the ring, or moving, body, rolls, or swashes, by magnetic attraction for example, as hereinbefore described, and to the other shaft (in the same axial line but disconnected from it) of which is connected, through the flexible medium, the ring, or moving body, itself. If the first shaft be fixed, the second shaft can have rotatory motion of variable speeds in one direction of rotation conveyed to it as hereinbefore described, but if the second shaft be fixed the first shaft can have a variable speed conveyed to it in the opposite direction of rotation.

From the foregoing it will be readily understood that the arrangements can be variously applied in a great number of manners, without departing from the nature of my invention; I have illustrated for instance in Figures 20, 21 and 22, some arrangements which will be readily understood from the preceding descriptions. Figure 20 shews a swash-ring carried between two pathways. Figure 21 shews two pathways presented outwards and with two swash-plates on one shaft and one co-acting with each pathway and with magnets common to both pathways. Figure 22 shews a number of swash-plates on one shaft each co-acting with its own pathway. In these figures the inclination of the swash-plates to regulate speed is alterable by screw adjustments which are analogous to those hereinbefore described and which will be readily understood from the drawings without special description.

By taking the electric current from the source of supply to the rolling, or swashing, ring, or plate, and thence through the point of contact of the said ring, or plate, with the segmental pathway, to the iron or steel core of the magnets and then through the windings of the magnets and to a conductor common to all the magnets and back to the source of supply there is no loss in power such as would be due to the friction of brushes on a commutator.

It has previously been proposed to produce the rotation of a toothed ring by causing it to roll upon the interior of a cylindrical casing by electro-magnetic means.

It is to be understood that in the following claims the expression "paths" includes peripheral, or diametrical paths of the circular bodies; that the expression "electro-magnetic" includes any magnetic means which can be employed for the purposes of this invention; that the expression "imparting" means also assisting in imparting; that the expression "swashing motion" includes rolling motion and both rolling and swashing motions, and the expression "swash ring" includes a single or multiple swashing, or rolling or swashing and rolling body, and that the expression "one of such bodies" includes also more than one of such bodies, and further that the expression "shaft" includes any equivalent of a shaft.

Having now particularly described and ascertained the nature of my said invention and in what manner the same is to be performed, I declare that what I claim is:—

1. The combination with a driven shaft, of a motor therefor, comprising a swashing body, a universal joint connection between the said swashing body and the shaft, a second body with a circular path on which the said swashing body travels, and electromagnetic means for imparting swashing movements to the swashing body to cause it to travel around the said circular path, the said bodies being so arranged that, during each complete cycle of the swashing movements, only a small rotational movement of the swashing body round its centre in either direction (and when desired no rotational movement) is imparted to the driven shaft through the universal joint connection.

2. The combination with a construction in accordance with claim 1, of means for varying the angle of inclination of the swashing body whilst the motor is in operation.

3. A construction such as specified in claim 1, in which one of said bodies is of cone shape and the other a ring, together with means for varying the relative axial position of said bodies with respect to each other while the motor is in operation.

4. The combination with a driven shaft of a motor therefor, comprising a swashing body with a universal joint connection between the said swashing body and the shaft, a second body with a circular path on which the said swashing body travels, the said path consisting of a circular series of separate insulated electric conductors successively conveying electric current from the swashing body to the magnets, a series of electro-magnets arranged about the said pathway and serving, on successive energization, to successively attract the swashing body and cause it to travel round the said pathway, the said bodies being so arranged that, during each complete cycle of the swashing movements, only a small rotational movement of the swashing body around its center is imparted to the driven shaft through the universal joint.

In testimony whereof I have signed my name to this specification in the presence of two subscribing witnesses.

HARRY JOHN FEREDAY.

Witnesses:
P. R. JOCELINE,
R. G. ARTHURS.